C. T. CUTLIP.
WIND SHIELD FASTENER.
APPLICATION FILED MAR. 4, 1915.
1,176,205.
Patented Mar. 21, 1916.
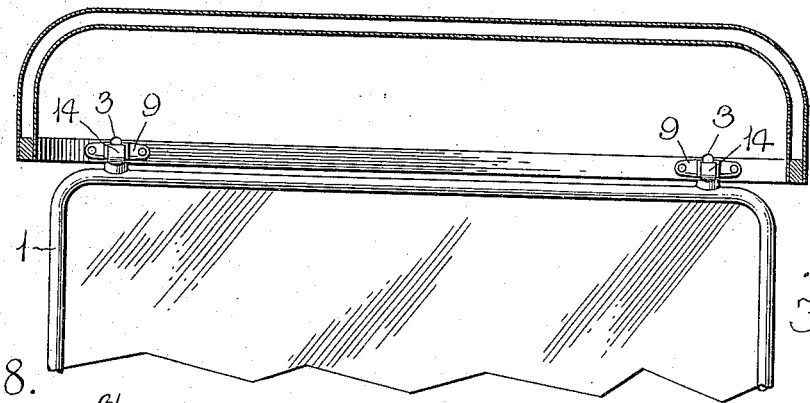
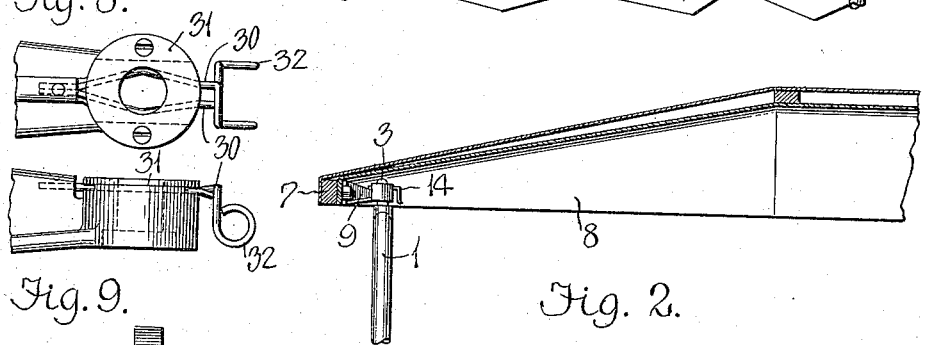
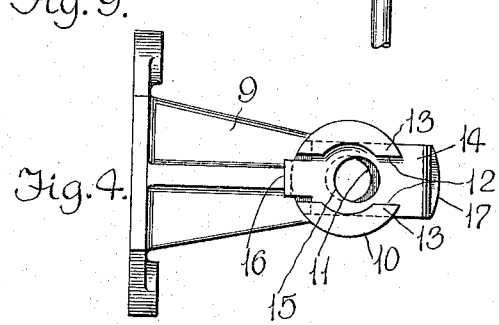
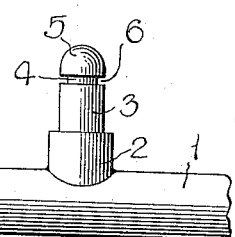
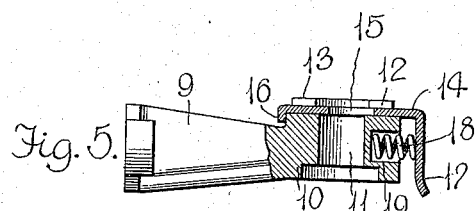
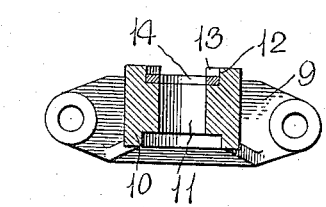
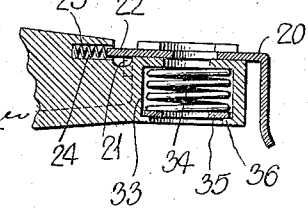
Inventor
Charles T. Cutlip,
Witnesses
Attorneys

UNITED STATES PATENT OFFICE.

CHARLES T. CUTLIP, OF DETROIT, MICHIGAN.

WIND-SHIELD FASTENER.

1,176,205.  Specification of Letters Patent.  Patented Mar. 21, 1916.

Application filed March 4, 1915. Serial No. 12,080.

*To all whom it may concern:*

Be it known that I, CHARLES T. CUTLIP, a citizen of the United States of America, residing at Detroit, in the county of Wayne and State of Michigan, have invented certain new and useful Improvements in Wind-Shield Fasteners, of which the following is a specification, reference being had therein to the accompanying drawings.

In the use of flexible foldable tops for vehicles, particularly of the automobile type commonly styled "one-man top", it is desirable that some fastening means be provided for connecting the forward end of the top to the vehicle body or an accessory thereof. It is the present practice to use a pair of straps for this purpose, the straps being connected to the front bow of the top and to the automobile body. The function of these straps is to hold the top in position when up and it is a desideratum to maintain the front bow in a given position, but straps fail in this respect. If the straps be too tight the bow is pulled too far forward, and the top is unduly stretched or misshapen. On the other hand, if the straps are too loose they naturally flap and the top is buckled or creased. In either event the effect is very undesirable and it is a matter of fact that it requires an expert to properly adjust the straps and top and even he cannot always obtain this result. Then again, in connection with a rigid or flexible automobile top numerous cumbersome devices have been resorted to for connecting the forward end of a top to a windshield or other vehicle accessory, all of which have been difficult to operate besides detracting from the general appearances of an automobile.

The present invention provides a means of securing a top to a windshield wherein the disadvantages alluded to above are wholly eliminated, and at all times and under all conditions the front bow or forward portion of the top is definitely positioned, rigidly and substantially secured in its relation to a windshield. This is accomplished by providing practically invisible hold fast devices consisting of members that are fixed relative to the forward bow of a top and the upper rail or frame of a windshield, said members automatically interlocking when the bow of the top is carried forward over the windshield and correctly positioned. It is practically impossible for the forward end of the top to become accidentally displaced, unduly strained by reason of its fastened forward bow, sagged or otherwise distorted, and provision is made whereby the members of the hold-fast devices can be expeditiously and easily released when it is desired to lower or fold the top. The hold-fast devices affect in no wise the function of the top or the windshield, and in the general make-up of the devices, the parts are constructed with a view of reducing the cost of manufacture and at the same time retain the features by which safety, durability, simplicity and ease of fabrication are secured, and with such ends in view, my invention resides in the novel construction, combination and arrangement of parts to be hereinafter specifically described and then claimed.

Reference will now be had to the drawings, wherein—

Figure 1 is an end view of the hold-fast devices in connection with a portion of an automobile top and a portion of a windshield, showing the two connected together; Fig. 2 is a side elevation of one of the hold-fast devices showing the top and windshield equipment; Fig. 3 is an elevation of a windshield member; Fig. 4 is a plan of a top bow member; Fig. 5 is a side elevation of the same, partly broken away and partly in section; Fig. 6 is a cross sectional view of the top bow member; Fig. 7 is a longitudinal sectional view of a portion of a modified form of top bow member, and Figs. 8 and 9 illustrate a plan and a side elevation of a modified form of hold-fast device.

In describing my invention by aid of the views above referred to, I desire to point out that I intend the same as merely illustrative of an example whereby my invention may be applied in practice, and I do not care to confine my invention to the precise construction, arrangement of parts or its application as shown. The following description is therefore to be broadly construed as including substitute constructions and arrangement of parts which are the obvious equivalents of those to be hereinafter referred to.

In the drawings, 1 denotes, by the way of an example, the upper rail of a windshield frame and contiguous to the end of said rail are bosses 2 provided with posts or pins 3. These last mentioned elements may be integral or suitably attached to the rail, and the upper ends of the posts or pins terminate in shanks 4 having rounded or button heads 5. The heads 5 coöperate with the posts or pins 3 in providing annular grooves 6 and each post or pin constitutes a member of a hold-fast device employed for detachably connecting the forward bow 7 of an automobile top 8 to the windshield.

Suitably connected to the inner side of the forward bow 7, in proximity to the side arms of said bow, are brackets 9 terminating in sockets 10 adapted to receive the posts or pins 3 of the windshield equipment. The sockets 10 are provided with vertical openings 11 to receive the posts or pins 3 and the upper ends of the sockets are grooved, as at 12 and the side walls of each groove undercut to provide overhanging retaining flanges 13. Slidable in the groove 12 of each socket and retained therein by the overhanging flanges 13 is a slide 14 provided with an opening 15 adapted to register with the opening 11 of the socket. The inner end of the slide is bent downwardly to provide a stop 16 adapted to impinge the socket 10 and coöperate therewith in limiting the movement of the slide in one direction. The outer end of the slide is bent downwardly to provide a handle or finger piece 17 and interposed between said finger piece and the socket 10 is a coiled compression spring 18 which retains the stop 16 normally in engagement with the socket 10 and the slide 14 in an extended or closed position. The socket 10 has a recess 19 housing convolutions of the compression spring 18 and preventing said spring from becoming accidentally displaced.

A modification of this construction is shown in Fig. 7, wherein the inner end of a slide 20 has a portion 21 thereof depending to constitute a stop and another portion 22 thereof extending into a recess 23 containing a coiled compression spring 24. This spring serves the same purpose as the spring 18. Since the slides of the socket members are yieldable in one direction, the socket members can be snapped down over the posts or pins 3, the button heads of said posts or pins causing the slides to recede and the openings 15 thereof to register with the openings 11 of the socket members. Immediately upon the socket members being seated upon the bosses 2 of the windshield equipment, the slides 14 are released and the wall of each slide opening 15 enters the groove 6 of each post or pin, thereby locking the two equipments together whereby vertical or lateral displacement of the automobile top relative to the windshield is practically impossible.

By pressing upon the finger pieces 17, the slides 14 are shifted whereby the openings 15 thereof register or aline with the openings 11 of the socket members. The automobile top is then released insomuch that it is held sufficiently taut that impetus is imparted to the top to withdraw the socket members off the posts or pins 3. It is then only necessary to push the forward end of the top rearwardly as is common in connection with the "one man top" or any ordinary foldable automobile top.

To facilitate a release of the automobile top relative to the posts or pins 3, the socket member shown in Fig. 7, has the vertical opening thereof enlarged to provide a recess 33 and in this recess is placed a coiled compression spring 34 seated upon a washer 35 retained within the recess 33 by an inbent or peened edge 36 of the socket member. When the socket member is placed upon the pin or post, the boss 2 engages the washer 35 and places the spring 34 under tension, said spring being held under tension as long as the slide of the socket member engages the pin or post. Immediately upon the slide releasing the pin or post, the tension of the spring 34 is sufficient to elevate the socket member and impart impetus thereto that completely removes the socket member from the pin or post. I attach considerable importance to this construction as it materially facilitites the manipulation of an automobile top, and it is apparent that springs can be readily embodied in the other forms of socket members shown.

From the foregoing it will be observed that the slide 14 constitutes a gripping member and in lieu of this slide, the socket 10 can be provided with two resilient gripping members 30, preferably made of wire and retained in engagement with the socket by a detachable plate 31. The inner ends of the members 30 are held by the brackets 9 and the outer ends thereof are crossed and shaped, as at 32 to provide finger pieces, which can be pressed together to separate the gripping members 30 and release a post or pin held thereby.

With the windshield equipment at the upper edge thereof and the top equipment at the inner side of the forward bow, the hold-fast devices are practically invisible, yet within easy reach of a chauffeur or driver of a vehicle equipped with hold-fast devices in accordance with this invention. The devices can be finished to harmonize with metallic fittings or accessories of an automobile and when made of strong and durable metal will outlast the life of a top or a windshield.

What I claim is:—

1. A hold-fast device comprising a pin provided with a groove, a socket adapted to receive the pin, a slide at an end of said socket adapted to engage in the groove of said pin, and means in said socket adapted to raise said socket relative to said pin when released by said slide.

2. A hold-fast device comprising a pin provided with a groove, a socket adapted to receive said pin, means at the upper end of said socket adapted to engage in the groove of said pin and hold said pin relative to said socket, and means in said socket adapted to move said socket relative to said pin when released by the first mentioned means.

In testimony whereof I affix my signature in presence of two witnesses.

CHARLES T. CUTLIP.

Witnesses:
KARL H. BUTLER,
ANNA M. DORR.

Copies of this patent may be obtained for five cents each, by addressing the "Commissioner of Patents, Washington, D. C."